United States Patent [19]

Taylor

[11] 4,401,977
[45] Aug. 30, 1983

[54] RADIO TRANSMITTER FOR REPEATED BURSTS OF OSCILLATIONS

[75] Inventor: Derek R. Taylor, Barnstead, England

[73] Assignee: Mastiff Security Systems Limited, Surrey, England

[21] Appl. No.: 222,942

[22] Filed: Jan. 6, 1981

[30] Foreign Application Priority Data

Jan. 7, 1980 [GB] United Kingdom ................ 8000356

[51] Int. Cl.³ .............................................. H03K 3/66
[52] U.S. Cl. .................................. 340/539; 340/359; 340/567; 331/173; 375/21
[58] Field of Search .................... 340/825.57, 825.65, 340/825.67, 825.69, 539, 542, 552, 565, 572, 573, 345, 346, 348, 353, 359, 541, 567; 331/172, 173; 332/9 R, 9 T, 10; 343/101, 110; 375/21, 23, 59, 68; 455/95, 100

[56] References Cited

U.S. PATENT DOCUMENTS

| | | | |
|---|---|---|---|
| 2,403,873 | 7/1946 | Mumma | 340/359 |
| 3,756,014 | 9/1973 | Zatsky et al. | 331/172 |
| 3,845,473 | 10/1974 | Kawashima | 340/825.65 |
| 4,053,879 | 10/1977 | Anderson | 340/348 |
| 4,162,448 | 7/1979 | Gilmour | 340/539 |
| 4,191,948 | 3/1980 | Stockdale | 340/539 |

Primary Examiner—Benedict V. Safourek
Attorney, Agent, or Firm—Oblon, Fisher, Spivak, McClelland & Maier

[57] ABSTRACT

This radio transmitter is for use in an access control system and comprises a hands-free pocket token arranged to transmit bursts of oscillations at a preset carrier frequency with a preset number of carrier frequency cycles in each burst. The transmitter is controlled by a logic circuit driven from a counter of the number of oscillations both in a transmission burst and in the interval between bursts, so that a particularly simple system is provided which can be easily reset in accordance with requirements.

5 Claims, 1 Drawing Figure

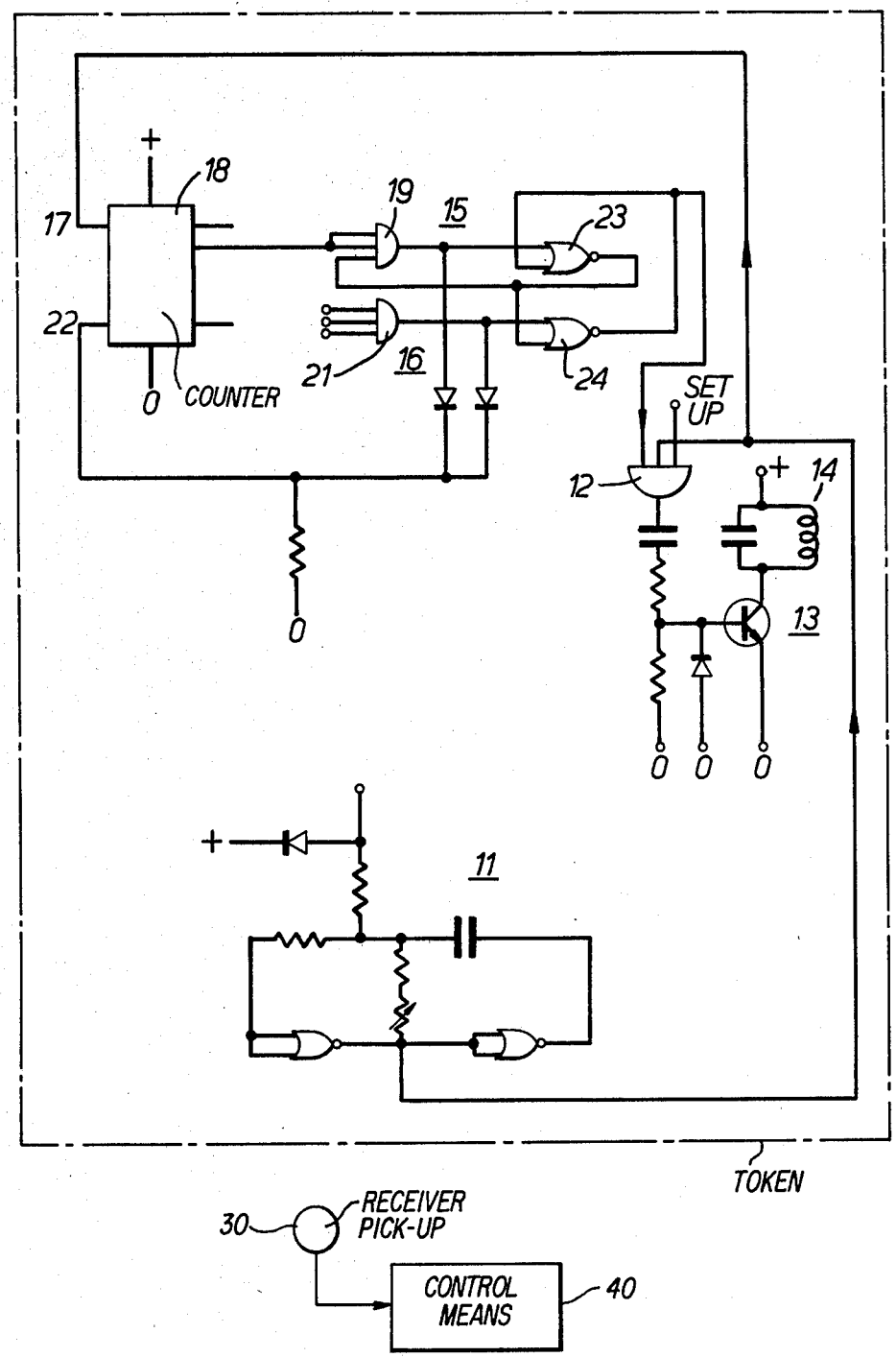

RADIO TRANSMITTER FOR REPEATED BURSTS OF OSCILLATIONS

This invention relates to radio transmitters and one object is to provide a control for such a transmitter, enabling the transmitter to transmit in bursts consisting of a preset number of carrier frequency cycles, separated by intervals for a different preset number of cycles. One application is to the access control system, the subject of British Pat. No. 1,528,901 in which the identity of the holder of a token incorporating a radio transmitter is established by the number of carrier frequency cycles in each burst, which number will differ from token to token, and so from individual to individual.

According to the present invention, a control for a radio transmitter includes a gate for controlling the supply of oscillations to an output, the gate being controlled by a logic circuit operated by a counter of the oscillations, to be open for a preset number of oscillations, and then to be closed for a preset number of oscillations. In the system described above, the number of oscillations during which the gate is open-which will identify the transmitter-will be substantially greater than the number of oscillations during which the gate is closed, which merely represents a break between burst of oscillations to be countered.

A single counter can be fed with oscillations and can feed two parallel logic paths which together control the gate.

The invention may be carried into practice in various ways, and one embodiment will now be described by way of example, with reference to the accompanying, drawing, of which the single FIGURE is a block diagram of a circuit of radio-transmitter.

The transmitter includes a CMOS oscillator 11 tuned to the desired carrier frequency, and arranged to supply its output through a gate 12, to an amplifier and transmitter indicated generally at 13, and including a resonant circuit 14 tuned to the carrier frequency. Oscillations are only supplied to the transmitter 13 when the gate 12 is open, by virtue of a 1 pulse on an input from a pair of logic paths 15 and 16.

The output from the oscillator 11 is fed to a second input to the gate 12, and also to the input 17 to a counter 18. Two coded outputs from the counter 18 depending on the preset number of carrier frequency cycles in the bursts of transmission, and in the intervals between bursts respectively, are connected to control AND gates 19 and 21, respectively in the two logic paths 15 and 16. Each of the AND gates 19 and 21 has its output connected through a rectifier to the reset terminal 22 of the counter 18, so that when either count is achieved the counter is reset and starts again to count the other number.

The outputs of the AND gates 19 and 21 are also connected each to one input of its respective NOR gate 23 or 24. The output of the NOR gate 23 is fed back to one input of the AND gate 19, and to one input of the NOR gate 24. The output of the NOR gate 24 is fed to one input of the AND gate 12 and also to one input of the NOR gate 23.

If there is an '0' at the output of the NOR gate 24, so that the AND gate 12 is closed, and oscillations are not delivered to the transmitter 13, there will be a 1 at the input to the AND gate 19, and a signal from the counter 18 when the count corresponding to the number of cycles between bursts has been achieved will reset the counter at 22, and will produce a '0' at the output of the NOR gate 23, which will in turn produce a 1 at the output of the NOR gate 24 to open the AND gate 12, and to produce a '0' at the input to the AND gate 19, which is therefore held closed. The counter 18 counts pulses at 17, until the count corresponding to the set number of cycles in a burst has been achieved, when the counter is arranged to provide a 1 to all the inputs at the AND gate 21, which therefore delivers a 1 to the NOR gate 24 which delivers a '0' to close the AND gate 12 to further oscillations, and to the NOR gate 23 whose output changes to 1 which appears at the AND gate 19. At the same time the counter 18 is reset at 22 from the output of the AND gate 21 to start counting the interval again.

It will be appreciated that this is a simple circuit for achieving the desired result, which is independent of variations in frequency of the oscillator, which thus does not have to be an expensive item.

The lengths of the two time intervals in terms of number of pulses, can be easily reset, by connecting appropriate coded outputs from the counter 18 to the two AND gates 19 and 21.

For original setting up and tuning of the transmitter 13 to the oscillator 11, all three inputs of the AND gate 12 can be connected together to the output of the oscillator.

The count is very accurate, and a large number of different identities differing one from another perhaps only by a cycle or two in a burst, can be used on the system. A count of 500 of 1500 is possible.

The transmitter is embodied in a pocket token capable of operating continuously while in the wearer's pocket to generate signals which can be picked up at a loop 30 where access is to be controlled. The receiver 30 can be as described in British Pat. No. 1,528,901.

The system is also useful as an adjunct to the access control systems 40, the subject of British Pat. Nos. 1,414,119 and 1,414,120, which give an access signal when they recognize that a particular frequency is present at a pick-up point. In addition to the identification that the transmission is at the particular frequency, there can be the means of identifying the token by the number of carrier frequency cycles in a burst in accordance with this invention.

The circuit can be easily reset for a different frequency or a different number of cycles in a burst, by adjusting respectively the oscillator 11 and the connections to the AND gate 21 from the counters 18.

What I claim as my invention and desire to secure by Letters Patent is:

1. A radio transmitter including a source of oscillations, an output, a gate for controlling the supply of oscillations to the output, a counter of the oscillations from the source, a logic circuit controlled by the output of the counter for opening the gate, and means responsive to the counting of a preset number of said oscillations for closing the gate and re-setting the counter, whereby the transmitter acts continuously to produce bursts of the preset number of oscillations separated by breaks in transmission, all the transmitter components being embodied in a pocket token.

2. A transmitter as claimed in claim 1 in which the gate is controlled by the logic circuit to be closed for breaks equal to a preset number of oscillations.

3. A transmitter as claimed in claim 2 including means for controlling the frequency of the oscillator.

4. A transmitter as claimed in claim 1 in which the counter is arranged to be fed with said oscillations and has two outputs, and in which the logic circuit includes two parallel logic paths for together controlling the gate, and connected to the respective outputs of the counter.

5. An access control system including a radio pick-up at at least one location and at least one transmitter as claimed in claim 1, means for controlling access or giving an alarm in dependence upon whether a person at the location is carrying a transmitter giving bursts of oscillations with a preset number of oscillations in each burst.

* * * * *